H. JOHNS.
LOG GRAB HOOK.
APPLICATION FILED AUG. 21, 1909.
965,821.
Patented July 26, 1910.
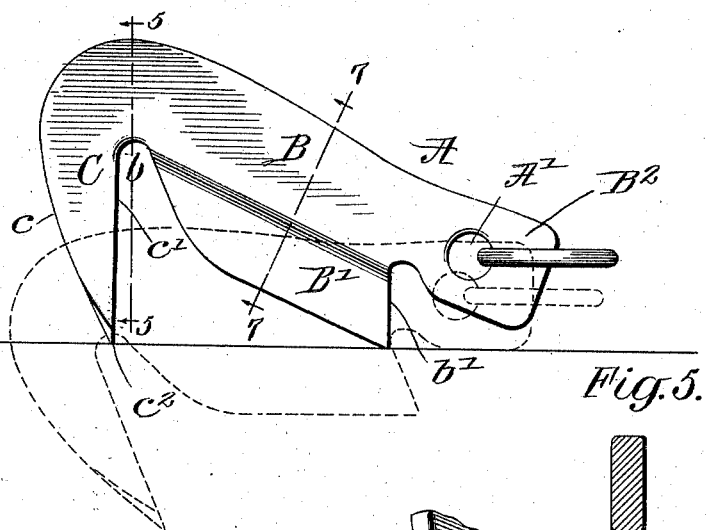
Fig. 1.
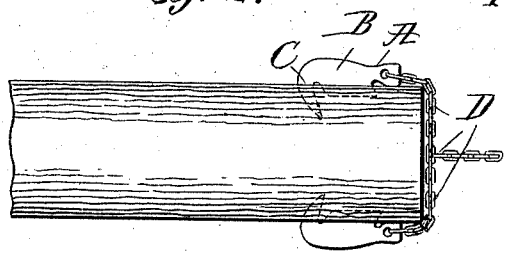
Fig. 2.
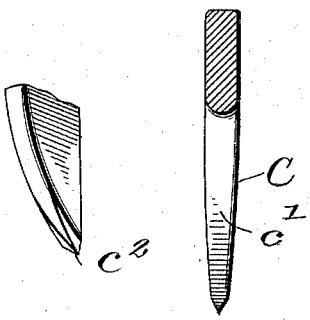
Fig. 4.
Fig. 5.
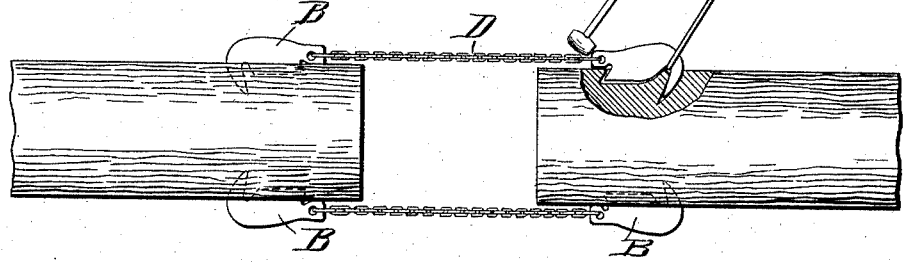
Fig. 3.
Fig. 6.
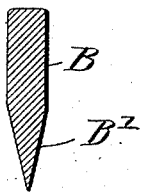
Fig. 7.
WITNESSES
Samuel E. Wade
G. B. Brock
INVENTOR
HORACE JOHNS.
BY Munn & Co
ATTORNEYS

UNITED STATES PATENT OFFICE.

HORACE JOHNS, OF MANHATTAN, PENNSYLVANIA.

LOG-GRAB HOOK.

965,821.  Specification of Letters Patent.  Patented July 26, 1910.

Application filed August 21, 1909. Serial No. 513,936.

*To all whom it may concern:*

Be it known that I, HORACE JOHNS, a citizen of the United States, and residing at Manhattan, in the county of Tioga and State of Pennsylvania, have invented an Improved Log-Grab Hook, of which the following is a specification.

My invention relates to tools used in lumber camps, and especially to an improvement in log grab hooks employed in securing a series of logs together or where one or more logs may be drawn from the stump to the mill or to a convenient place for transportation.

Among the special objects I have in view are to improve the general form of the grab hook whereby the same may be easily driven into a log and readily released therefrom when desired, and yet preventing likelihood of accidental displacement from the log.

With these and other objects in view my invention consists in certain novel features of construction, arrangement and combination of parts as will be hereinafter fully described and pointed out in the claims, reference being had to the accompanying drawings, in which—

Figure 1 is a side view showing grab before application to a log. Fig. 2 is a side view showing pair of grabs as in use. Fig. 3 is a view showing application to a pair of logs and one method of releasing hook. Fig. 4 is a perspective view of point of bill. Fig. 5 is a vertical section on line 5—5 of Fig. 1. Fig. 6 is a top edge view of grab, and Fig. 7 is a section on line 7—7 of Fig. 1.

In the drawings A represents my hook comprising a shank B and the bill C, the outer edge $c$ of which is curved while the inner edge $c'$ is straight proceeding from the rounded-out portion $b$ diagonally down to the diamond point $c^2$. The shank B has the blade portion B' which extends from the rounded portion $b$ to a point just in the rear of the eye A', the lower edge of the blade B' is sharpened and extends on a curve from rounded portion $b$ to the rear end of the blade; said rear end of the blade projects obliquely to the rear and has a flat face $b'$; said face lying slightly forward of the eye A'. The rear end of the shank where it surrounds the eye A' extends rearwardly a considerable distance forming a thickened portion $B^2$ against which a sledge or other suitable tool may be struck to drive the grab hook forwardly to disengage it from the log.

My improved grab is used principally in skidding logs through woods, and is pulled by a team hitched to the draft chain D; when the hook is driven into the log the diamond point $c^2$ readily enters the log and the blade B' also enters the log and prevents any side draft on the hook, the inner face of the bill having a straight draft while the outer face has a curved draft. To disengage the grab from a log the draft chain may be hooked into the space $b$, and the team started forward; if the bill does not become readily disengaged by this action, a smart blow with some suitable tool is struck against the rear thickened end of the shank which surrounds the eye A' whereupon the grab will be started forwardly and upwardly, the blade by virtue of its curved lower edge aiding in this movement.

My improved grab will be made of malleable steel and cannot become twisted or broken, the thickened portion $B^2$ of the shank preventing pulling out or breaking of the eye. My improved grab hooks may be also used for connecting logs that are floated in the water as illustrated in Fig. 3.

I claim:

1. A grab hook of the class described, comprising a bill and a shank, said shank having an eye and a downwardly projecting blade portion the lower sharpened edge of which extends in a curved line from the bill rearwardly to a point below the eye of the shank.

2. A grab hook of the class described, comprising a bill and a shank, said shank having an eye and a downwardly projecting blade portion the lower sharpened edge of which extends on a curve from the bill to a point below the eye of the shank, and the rear face of said blade portion extending rearwardly in an oblique direction.

HORACE $\times$ JOHNS.
<sub>his</sub>   <sub>mark</sub>

Witnesses:
JOSEPH H. PRESTON,
J. F. SUTTON.